US008840285B2

(12) United States Patent
Forant

(10) Patent No.: US 8,840,285 B2
(45) Date of Patent: Sep. 23, 2014

(54) UNDERWATER LIGHT APPARATUS

(75) Inventor: Robert G. Forant, Boston, MA (US)

(73) Assignee: Janine E. Gawryl, Auburn, NH (US)

(*) Notice: Subject to any disclaimer, the term of this patent is extended or adjusted under 35 U.S.C. 154(b) by 205 days.

(21) Appl. No.: 13/468,448

(22) Filed: May 10, 2012

(65) Prior Publication Data
US 2012/0287603 A1    Nov. 15, 2012

Related U.S. Application Data

(60) Provisional application No. 61/484,946, filed on May 11, 2011.

(51) Int. Cl.
*F21S 13/00*    (2006.01)

(52) U.S. Cl.
USPC .......................................... 362/431; 362/101

(58) Field of Classification Search
CPC ... A01K 63/06; A01K 63/006; A01K 63/003; A01K 87/007; A01K 97/125; F21S 8/043; F21S 8/036; F21W 2131/308; F21W 2131/401

USPC .................. 362/101, 431, 413; 119/266, 267; 43/17.5

See application file for complete search history.

(56) References Cited

U.S. PATENT DOCUMENTS 1,803,571 A * 5/1931 Ulman ............................ 362/92
2,779,866 A * 1/1957 Burlingham .................. 362/477
4,301,767 A * 11/1981 Willinger et al. ............. 119/245

* cited by examiner

*Primary Examiner* — Julie Bannan
(74) *Attorney, Agent, or Firm* — Hamilton, Brook, Smith & Reynolds, P.C.

(57) ABSTRACT

An underwater light apparatus includes a light assembly for providing light. An elongate support member having proximal and distal ends can be included. The distal end of the elongate support member can be secured to the light assembly. A mounting bracket can be included for mounting to a surface. The elongate support member can be vertically slidably mounted to the mounting bracket for vertically lowering and raising the elongate support member and the light assembly into water for providing underwater illumination, and out of water for maintenance.

17 Claims, 16 Drawing Sheets

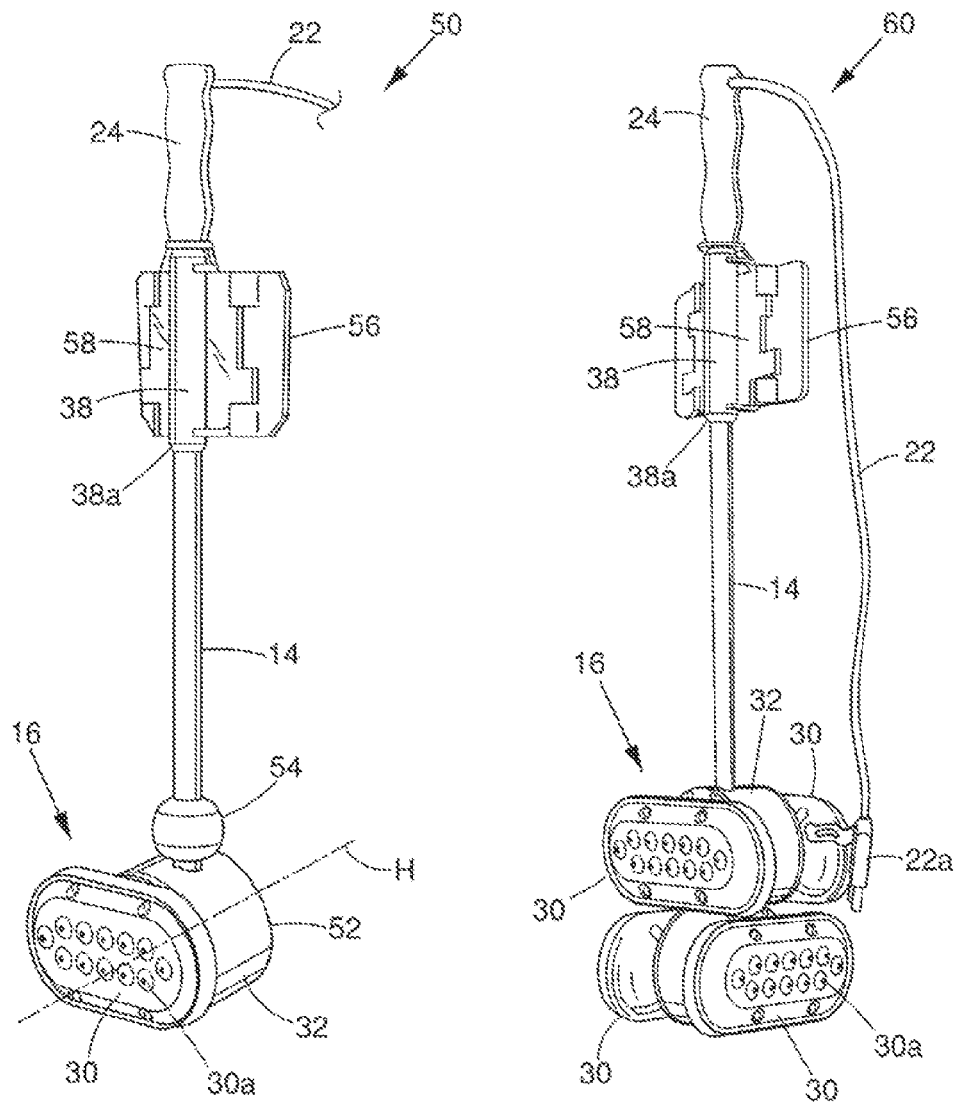

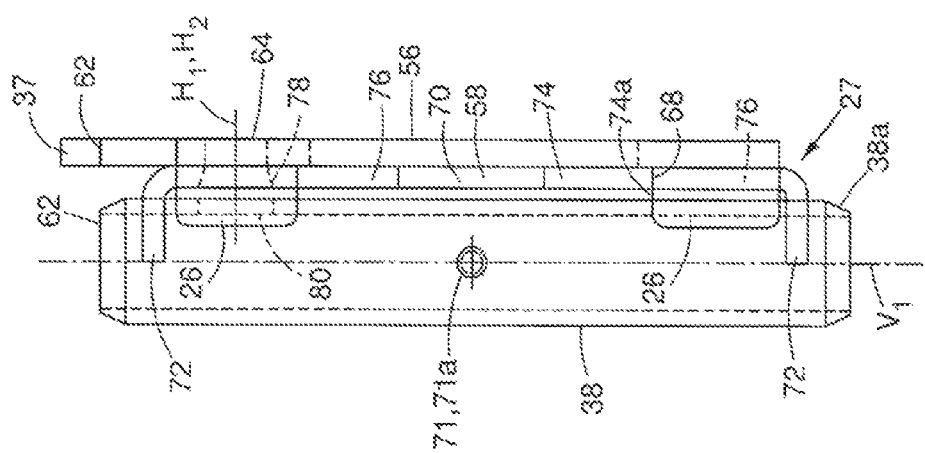
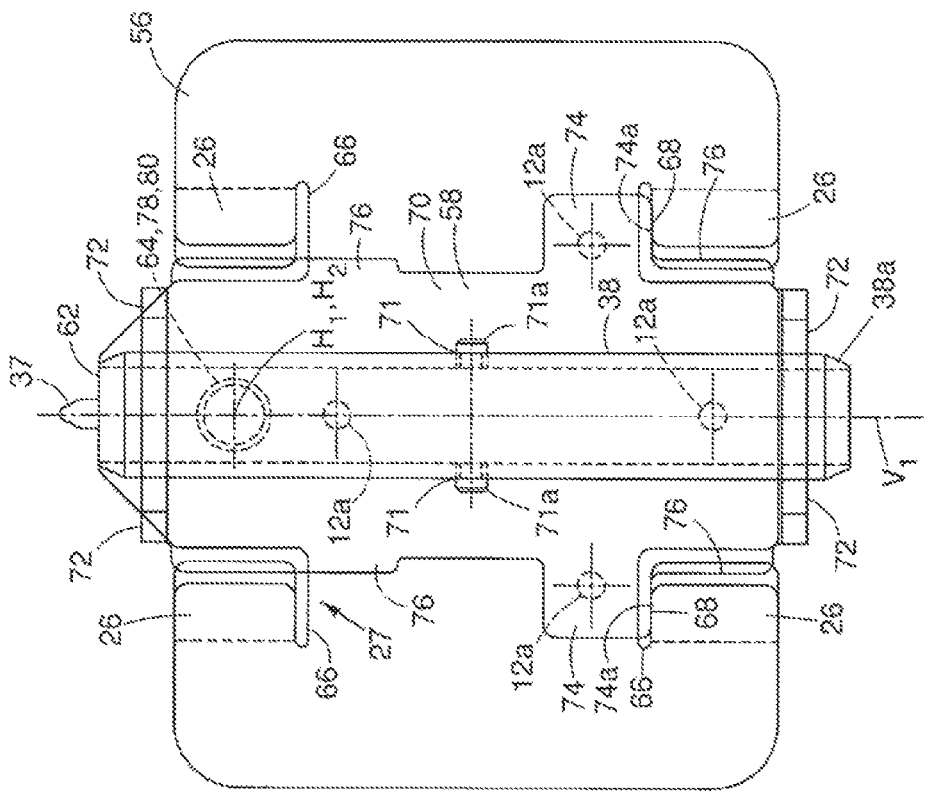

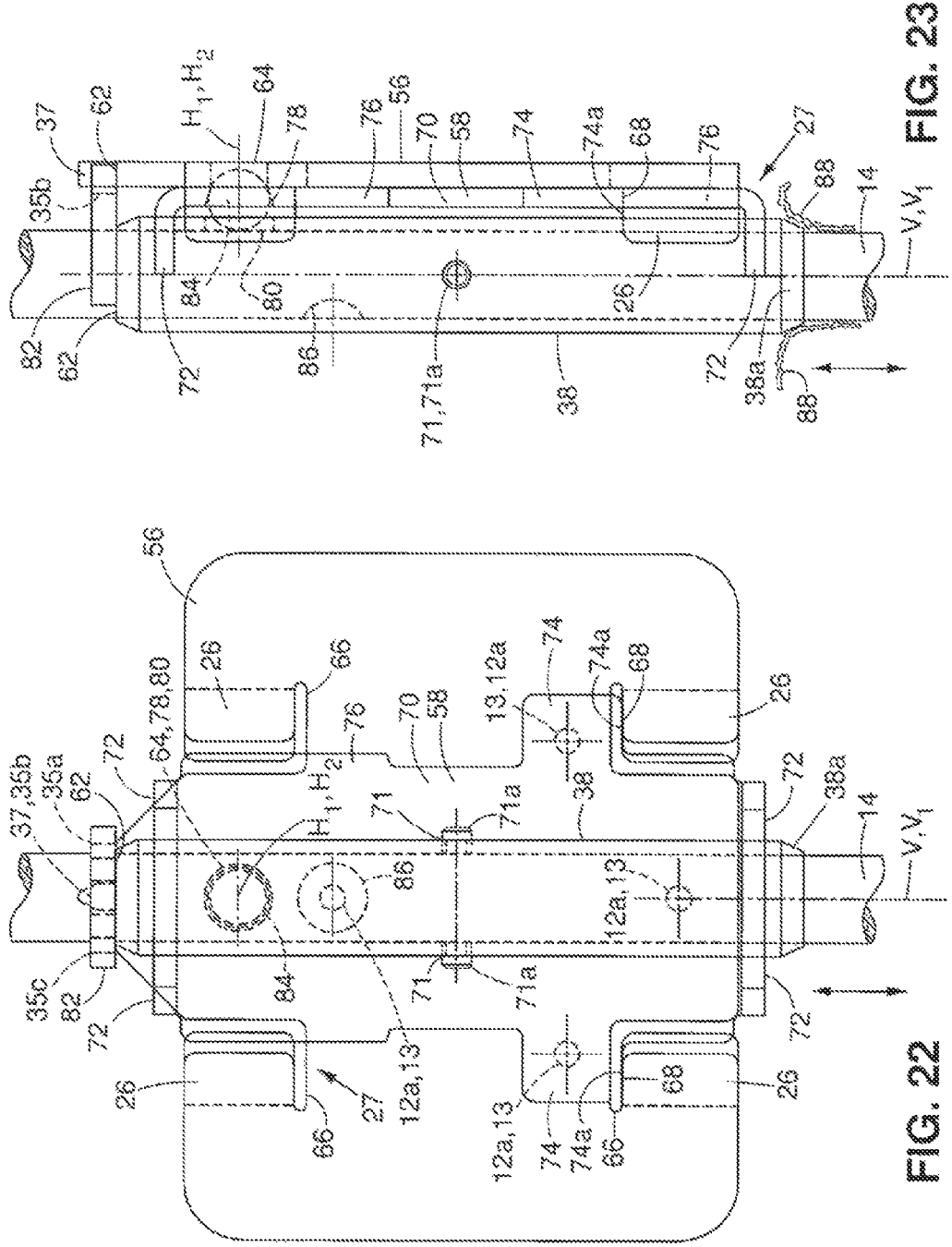

UNDERWATER LIGHT APPARATUS

RELATED APPLICATION

This application claims the benefit of U.S. Provisional Application No. 61/484,946, filed on May 11, 2011. The entire teachings of the above application are incorporated herein by reference.

BACKGROUND

Underwater lights are sometimes installed underwater to docks for illuminating the water at night. Over time, growth such as vegetation, seaweed, sea creatures and barnacles can grow on the underwater lights, and affect the amount of illumination provided, and the performance of the lights.

SUMMARY

The present invention provides an underwater light apparatus that can be installed to a surface, such as on a dock, a pile or bulkhead, which can allow easy lowering into the water for use, and raising out of the water for cleaning and maintenance, or removal, or replacement.

The present invention can provide an underwater light apparatus including a light assembly for providing light. An elongate support member having proximal and distal ends can be included. The distal end of the elongate support member can be secured to the light assembly. A mounting bracket can be included for mounting to a surface. The elongate support member can be vertically slidably mounted to the mounting bracket for vertically lowering and raising the elongate support member and the light assembly into water for providing underwater illumination, and out of water for maintenance.

In particular embodiments, the elongate support member can include a hollow tube containing electrical wires extending therethrough for electrical connection to the light assembly. The elongate support member can be vertically slidable within a vertically oriented guide tube. The guide tube can have a lower end with an angled cutting surface for cutting at least one of weeds, vegetation or barnacles from the elongate support member when the elongate support member is slid upwardly within the guide tube. The guide tube can be removably secured to the mounting bracket within a retaining structure. The retaining structure can include a vertically extending retaining track from which the guide tube can be vertically lifted for removal. A vertical stop and a rotational position locking mechanism can control vertical position and rotational orientation of the elongate support member and light assembly, when in a lowered position. The light assembly can include a housing secured to the distal end of the elongate support member and can have at least one LED light unit secured to the housing. The guide tube can be secured to a removable plate. The removable plate can be removably insertable into the retaining track. In some embodiments, the mounting bracket can include mounting holes for securement to a surface with fasteners. The mounting holes can be located within the retaining track to allow the removable plate to cover the mounting holes when inserted into the retaining track to hide the mounting holes. A movable locking ball can be movably positioned within an aperture extending through adjacent walls of the guide tube and removable plate, and can be capable of being forced by the elongate support member within the guide tube to extend a portion of the locking ball into a locking recess within the mounting bracket, thereby locking the removable plate and guide tube to the mounting bracket. The elongate support member can include a recess on a lateral surface for aligning with the locking ball, for allowing part of the locking ball to move therein, to recess the locking ball within the aperture through the guide tube and removable plate, thereby allowing insertion and removal of the removable plate in and out of the retaining track.

The present invention can also provide a method of operating an underwater light apparatus including providing a light assembly for providing light within water. The light assembly can be supported with an elongate support member having proximal and distal ends. The distal end of the elongate support member can be secured to the light assembly. A mounting bracket can be mounted to a surface and the elongate support member can be vertically slidably mounted to the mounting bracket. The elongate support member and the light assembly can be vertically lowered into the water for providing underwater illumination, and the elongate support member and the light assembly can be vertically raised out of the water for maintenance.

In particular embodiments, the elongate support member can be vertically slid within a vertically oriented guide tube. The guide tube can have a lower end with an angled cutting surface for cutting at least one of weeds, vegetation or barnacles from the elongate support member when the elongate support member is slid upwardly within the guide tube. The guide tube can be removably secured to the mounting bracket within a retaining structure. The retaining structure can be provided with a vertically extending retaining track from which the guide tube can be vertically lifted for removal. Vertical position and rotational orientation of the elongate support member and light assembly when in the lowered position, can be controlled with a vertical stop and a rotational position locking mechanism. The guide tube can be secured to a removable plate which can be removably inserted into the retaining track. In some embodiments, the mounting bracket can include mounting holes for securement to a surface with fasteners. The mounting holes can be located within the retaining track. The mounting holes can be covered with the removable plate when the removable plate is inserted into the retaining track to hide the mounting holes. A movable locking ball can be movably positioned within an aperture extending through adjacent walls of the guide tube and removable plate, and can be capable of being forced by the elongate support member within the guide tube to extend the portion of the locking ball into a locking recess within the mounting bracket, thereby locking the removable plate and guide tube to the mounting bracket. The elongate support member can be provided with a recess on a lateral surface for aligning with a locking ball, for allowing part of the locking ball to move therein, to recess the locking ball within the aperture through the guide tube and removable plate, thereby allowing insertion and removal of the removable plate in and out of the retaining track.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 is a perspective view of another embodiment of an underwater light apparatus in the present invention.

FIG. 12 is a perspective view of yet another embodiment of an underwater light apparatus in the present invention.

FIG. 19 is a front view of the removable plate and guide tube assembly of FIG. 16 assembled with the mounting bracket of FIG. 13.

FIG. 20 is a side view of the assembled components of FIG. 19.

FIG. 22 is a front view of the removable plate and guide tube assembly of FIG. 16 assembled with the mounting bracket of FIG. 13 and a support shaft.

FIG. 23 is a side view of the assembled components of FIG. 22.

DETAILED DESCRIPTION

Figure 1:
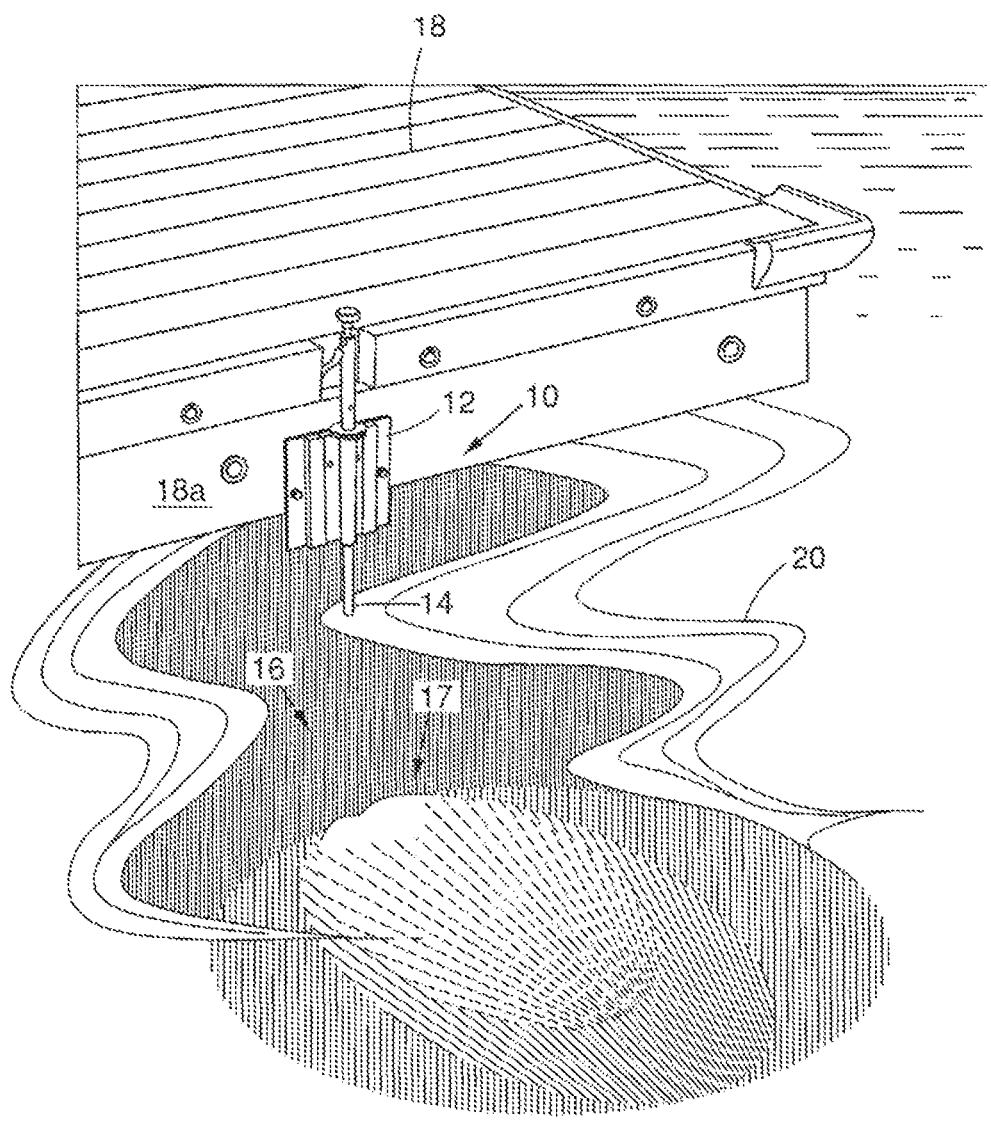
FIG. 1 is a perspective view of an embodiment of an underwater light apparatus that has been mounted to a dock and lowered into the water, and illuminating the water at night.

FIGS. 1-10 depict an embodiment of an underwater light apparatus, assembly, unit or fixture 10 in the present invention mounted to a surface 18a, such as on a pile, bulkhead, or a dock 18, for extending a light assembly 16 downwardly into the water 20 for providing or emitting light or illumination 17 (FIG. 1) into the water 20, such as at night, and raising upwardly (FIG. 2) above the water 20 for maintenance and cleaning. The light apparatus 10 can include a mounting plate or bracket 12 which can be secured or mounted to surface 18a with fasteners 13 such as screws or bolts, through mounting holes 12a, such as at least two holes on opposite sides of the mounting bracket 12. The light assembly 16 can be mounted to the distal end 14b (FIGS. 3-5) of an elongate hollow sliding support member, rod, shaft or tube 14, that can be vertically slidably mounted to the mounting bracket 12. The support tube 14 can be slidably lowered and raised relative to mounting bracket 12 along the vertical axis V for lowering and raising the light assembly 16. The support tube 14 can slidably extend through a guide structure, collar, bearing, tube or bushing 38 that is secured to the mounting bracket 12, and can also pivot or rotate therein. The guide tube 38 can form both a sliding and rotatable joint, and can be secured, attached or welded to a removable plate or member 28 to form a removable plate and guide tube assembly or fabrication 45 (FIG. 9), that has a longitudinal axis $V_1$ (FIGS. 6 and 9) positioned or aligned along the vertical axis V. The circular bottom end of the guide tube 38 can have an annular, circumferential, peripheral, or circular cutting end, edge, surface, or blade 38a formed or attached thereon, such as an angled chamfered, or narrowed edge or end.

Figure 9:
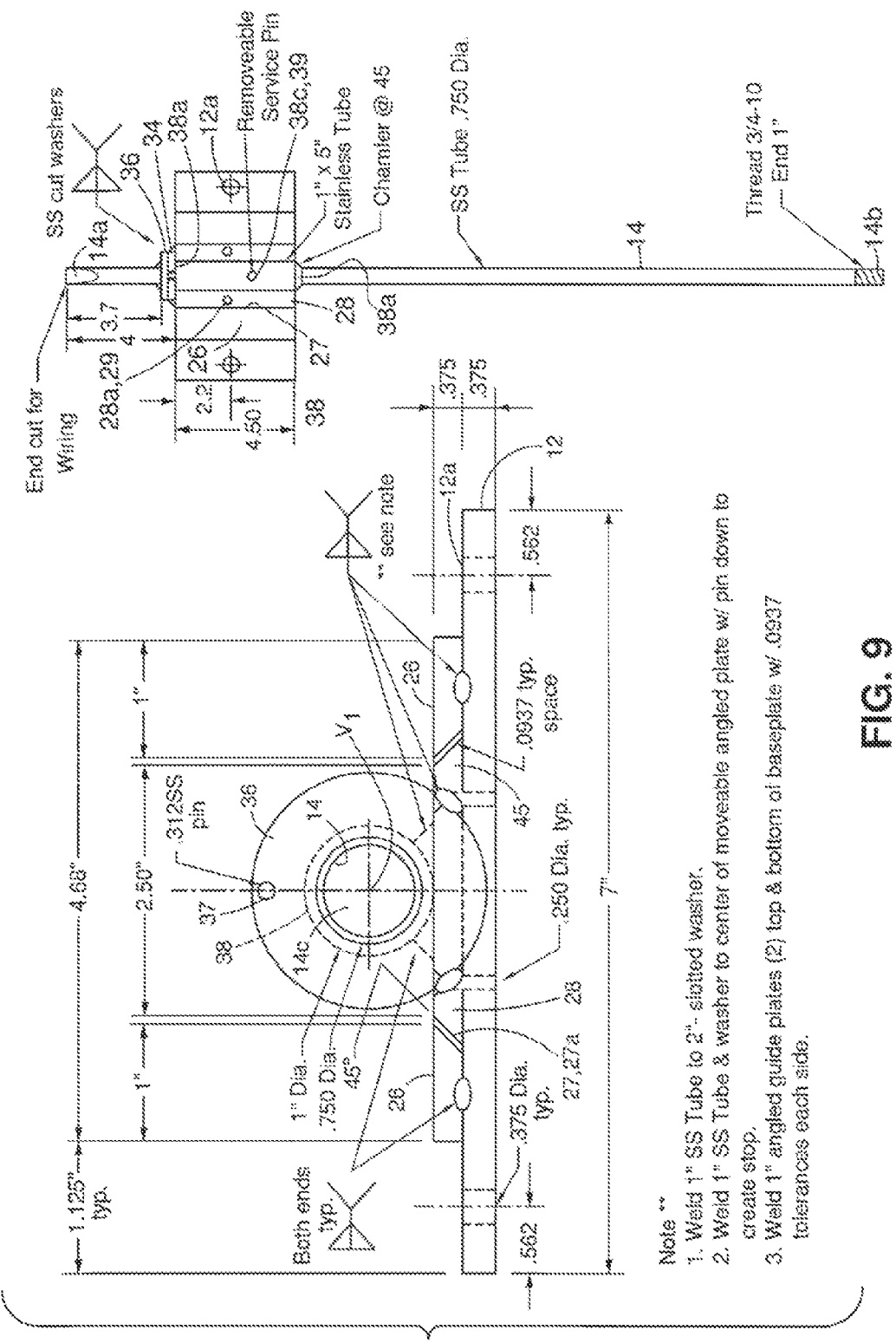
FIG. 9 is a process drawing for assembly of the components seen in FIG. 6, with top and front views.
Figure 10:
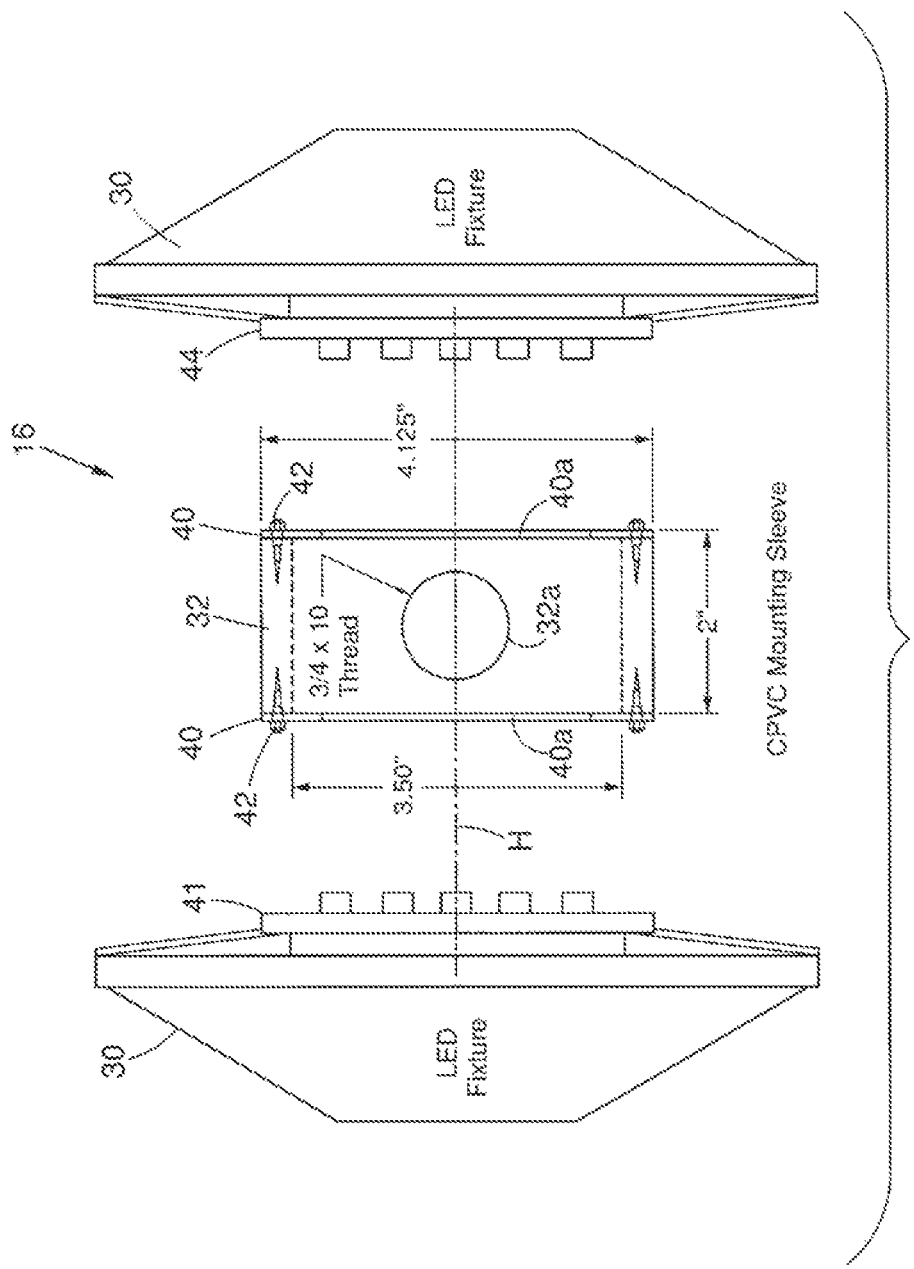
FIG. 10 is an exploded schematic view of an embodiment of a light assembly.

The removable plate 28 of assembly 45 can be vertically slidably insertable into and contained, constrained or trapped within a vertical guide or retaining structure, pocket, recess, slot, track or channel 27 between two guide rails, tabs, protrusions, walls, sides, surfaces or bars 26, welded to the base plate of mounting bracket 12 on opposite sides, and against the flat front surface of bracket 12. The removable plate 28 can have two angled or chamfered edges, such as at 45°, which mate or engage, and are retained or constrained with angled or chamfered edges of the guide bars 26, such as at 45°, and can have a gap 27a therebetween (FIG. 9). Locking screws 29 within threaded holes 28a in the plate 28 can removably lock or secure the plate 28 in place within track 27. A bottom or lower vertical stop 34 (FIG. 7) on the removable plate 28 can be connected, attached or welded to the top or upper end of plate 28 and/or guide tube 38 for engaging the top or upper surface of the mounting bracket 12, and preventing further downward travel in track 27, thereby allowing a fixed position to be maintained therein. An upper or top vertical stop 36 (FIG. 8) can be connected, attached or welded to the support tube 14 near the proximal end 14a. When support tube 14 is slid into the downward position during use, the upper vertical stop 36 can engage the bottom stop 34 to prevent further downward movement of the support tube 14. The bottom stop 34 can be formed of a washer having a central hole 34a for passage of support tube 14, and can include one or more slots or notches, for example three as shown, 35a, 35b and 35c, positioned at 45° intervals, with one notch 35b being positioned centrally and perpendicular to mounting bracket 12. The upper stop 36 can be formed of a washer having a central hole 36a to fit over support tube 14, and have a locking pin or protrusion 37 secured thereto, extending downwardly, which can be engaged within notches 35a, 35b or 35c of stop 34, to rotationally lock the support tube 14 and light assembly 16 in a desired rotational orientation relative to mounting bracket 12. A locking pin 39 (FIG. 9) can extend through guide tube 38 and support tube 14 to lock the support tube 14 in the down position.

An electrical power line or wire 22 can extend through the interior or longitudinal cavity or passage 14c (FIG. 9) of support tube 14 to electrically connect to and provide electrical power to light assembly 16. The electrical line 22 can extend through the opening at the proximal end 14a of the support tube 14 and can be sealed with a waterproof cover 24. Electrical line 22 can have an electrical connector or plug 22a for connecting to electrical power. The light assembly 16 can include a housing 32, such as a round or circular tube member having a horizontal longitudinal or central axis H positioned orthogonal or 90° to vertical axis V. The distal end 14b of the support tube 14 can be secured within a threaded hole 32a in the housing 32. Mounting fixtures, connectors, brackets or adapters 40 can be secured to opposite longitudinal ends of the housing 32, to which mounting connectors or brackets 44 of light fixtures 30 can be connected, secured or attached through connectors or openings 40a. The light fixtures 30 can be LED light fixtures having one or more LED elements 30*a*, and sealed in a waterproof manner. Although two light fixtures 30 are shown, in some embodiments, light assembly 16 can have a single light fixture 30 or more than two light fixtures 30.

Figure 2:
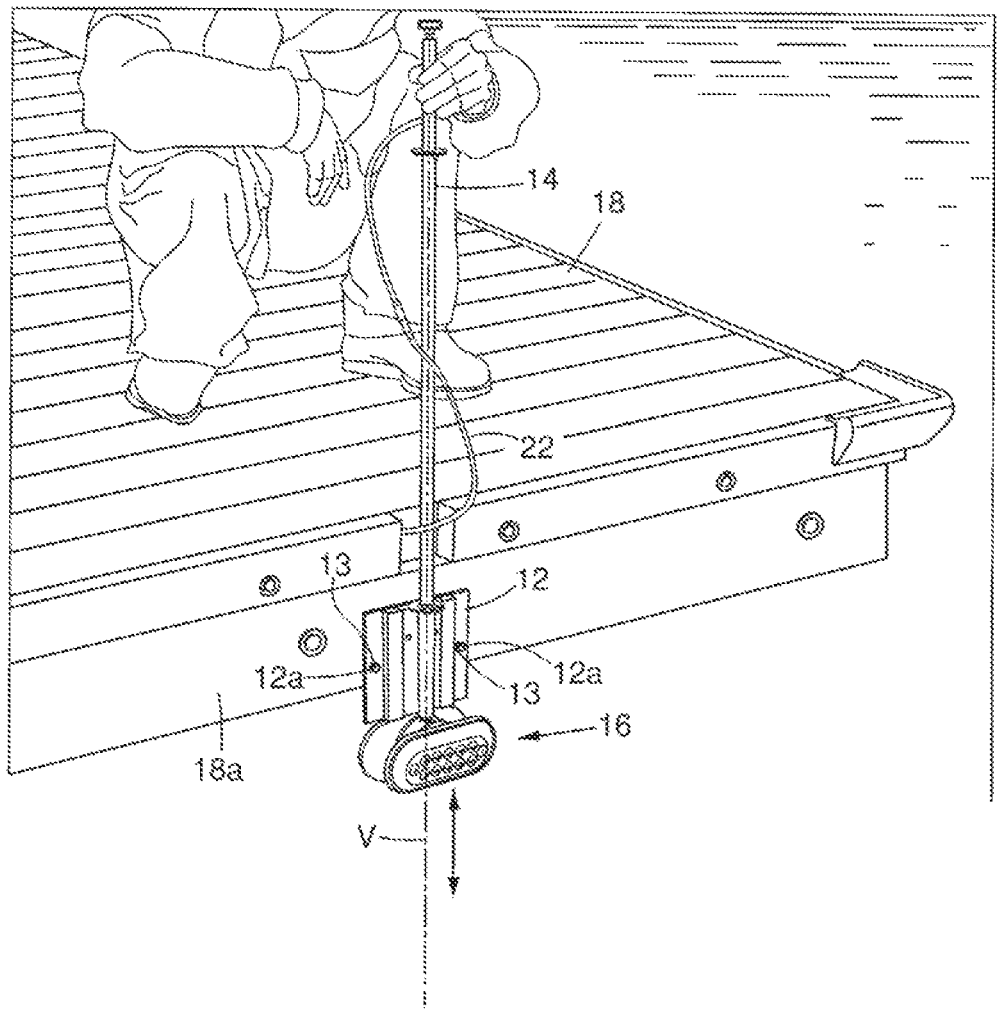
FIG. 2 is a perspective view of the underwater light apparatus of FIG. 1 in a raised position.
Figure 3:
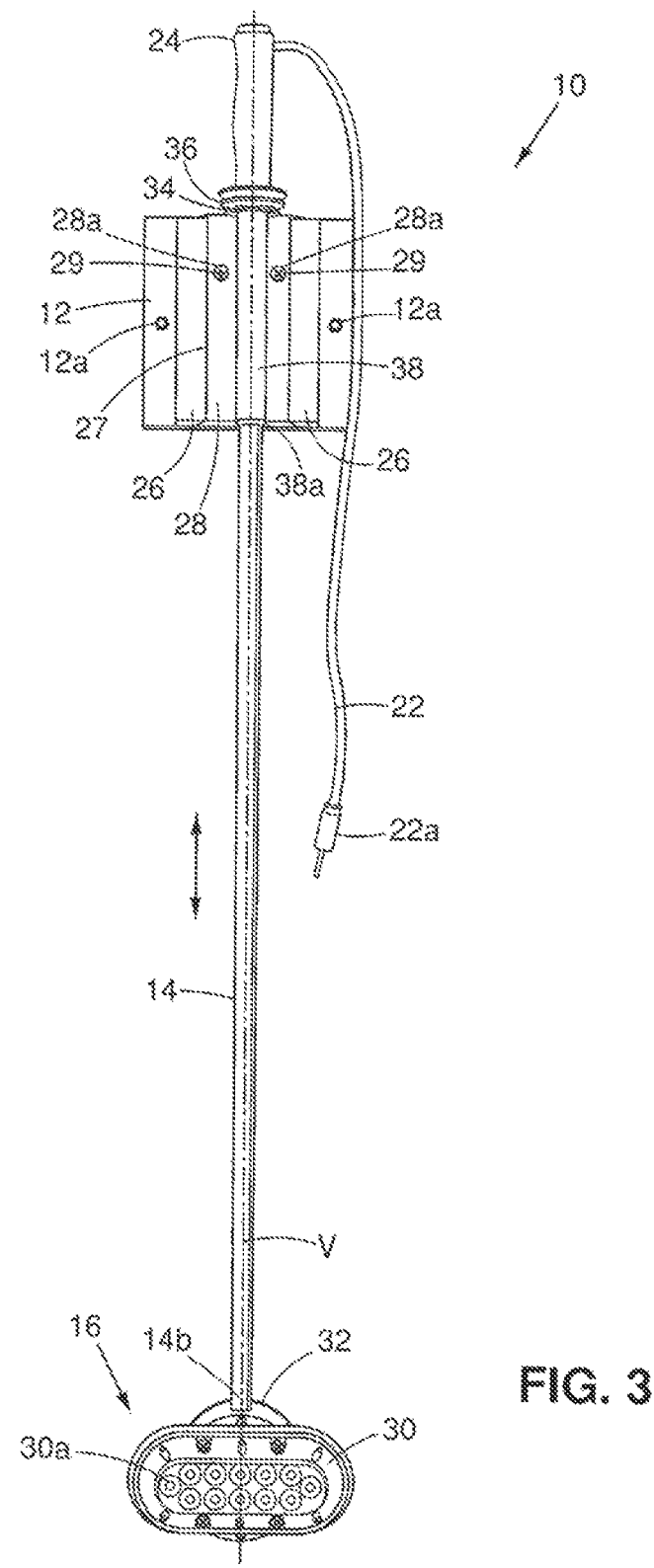
FIG. 3 is a front view of the underwater light apparatus of FIG. 1.
Figure 4:
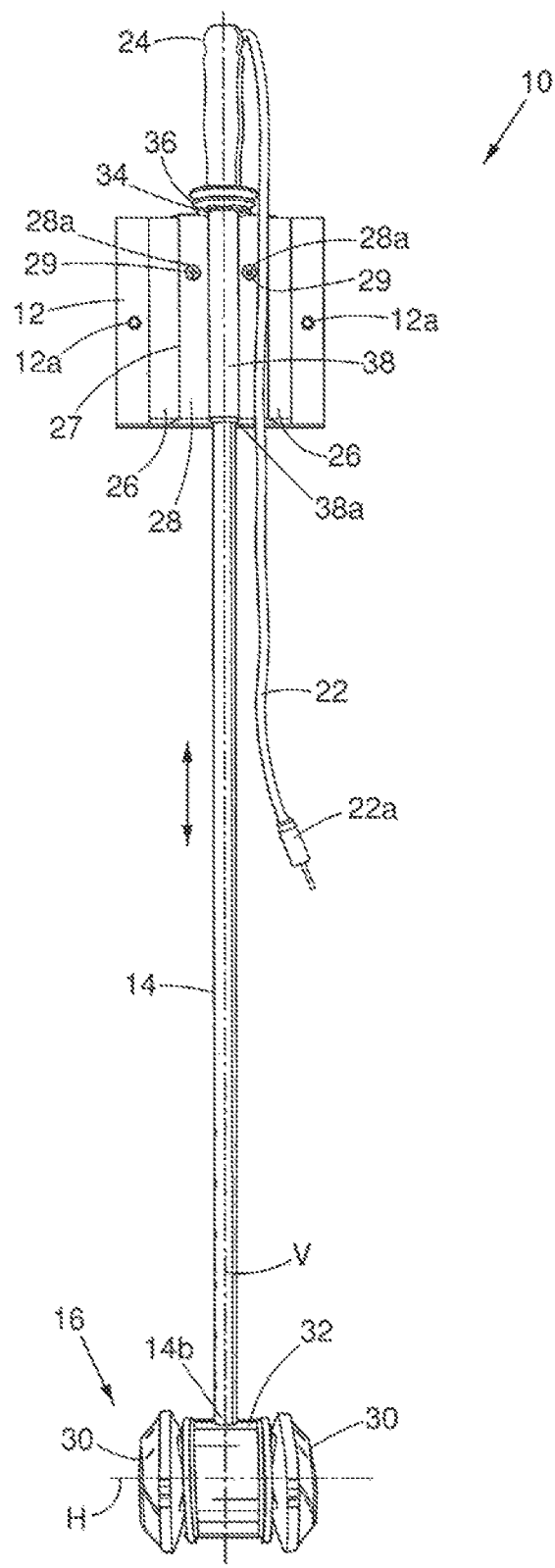
FIG. 4 is a front view of the underwater light apparatus of FIG. 3 with the light assembly rotated in a side or 90° position to that seen in FIG. 3.
Figure 5:
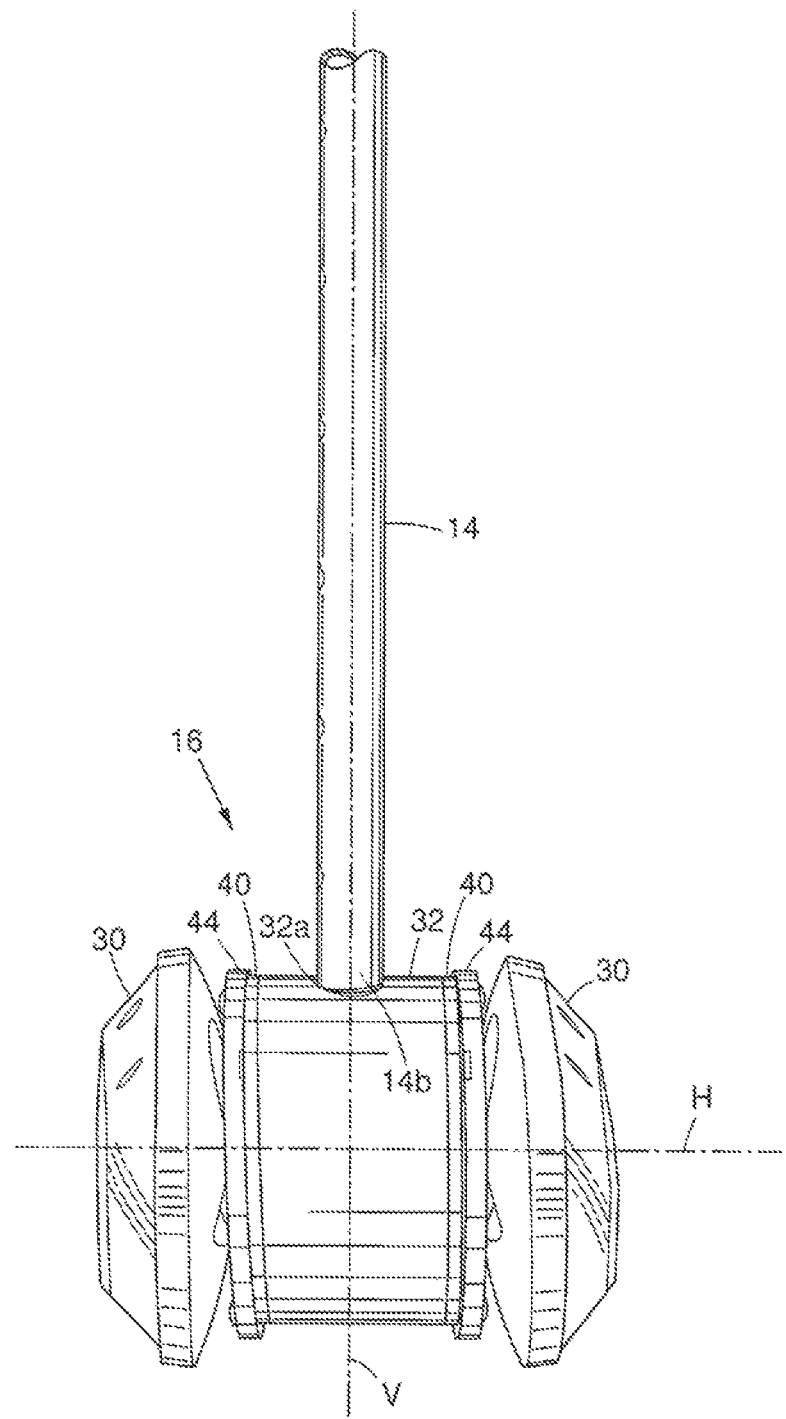
FIG. 5 is an enlarged view of the light assembly seen in FIG. 4.
Figure 6:
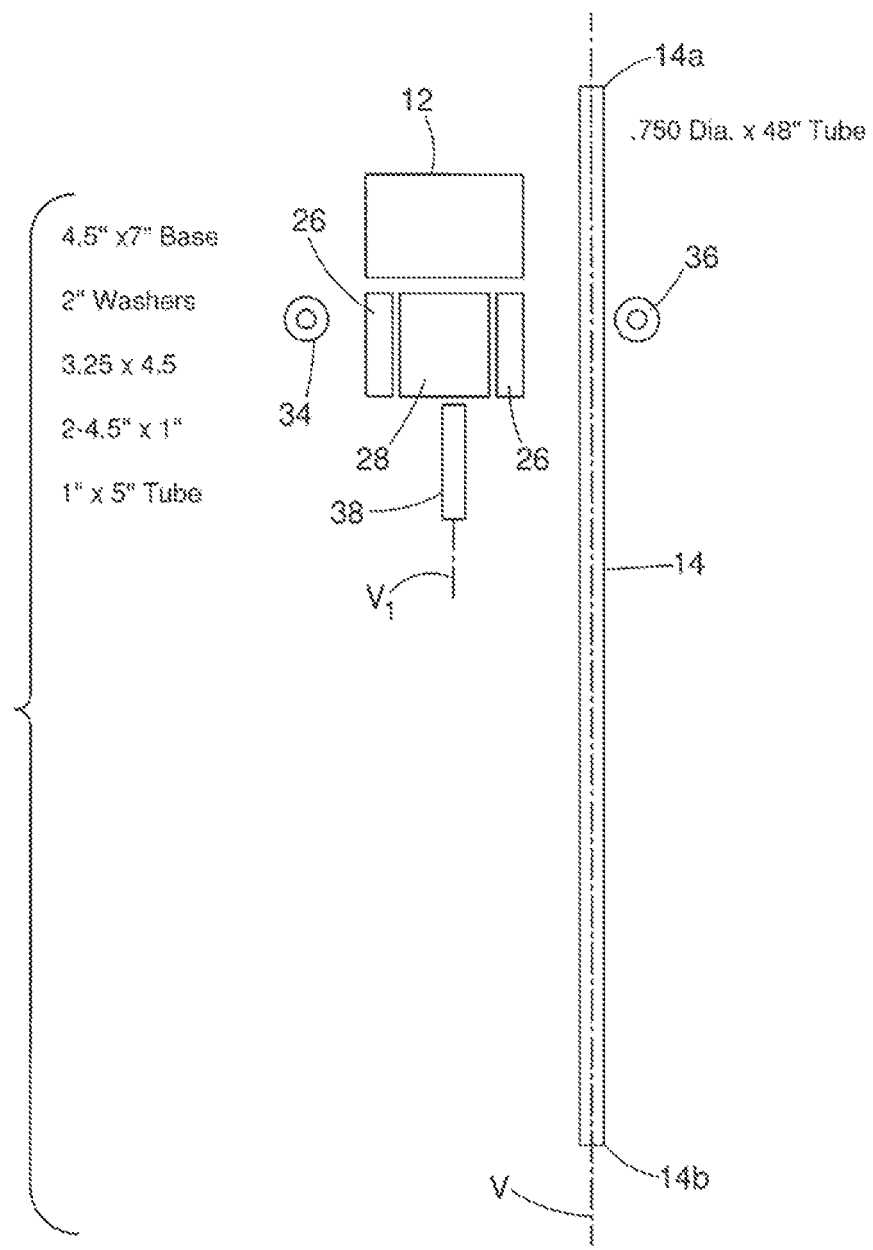
FIG. 6 is a plan view of components used in forming an embodiment of the mounting bracket and elongate support member.

Referring to FIGS. 1 and 2, in use, to clean or maintain the light apparatus 10, the locking pin 39 can be removed allowing support tube 14 to be slid vertically upwardly along axis V to raise the light assembly 16 out of the water 20, preferably every two weeks, to either spray or scrub (if needed) any growth off the light assembly 16. If any growth, vegetation or sea creatures such as seaweed or barnacles are on the support shaft 14, the annular or circular cutting edge or blade 38*a* formed on the bottom end of the guide tube 38 by the angle, chamfer, or narrowing edge thereon, can circumferentially or peripherally cut the growth off the support tube 14 as the shaft 14 slides upwardly. The cutting edge 38*a* can have a narrow pointed edge circumferentially adjacent to the outer surface of the support tube 14, which then circumferentially angles or widens outwardly upwardly, so that as the support shaft 14 is slid upwardly relative to the guide tube 38, the outer diameter of the support tube 14 can be in or close to sliding contact with the inner diameter of the guide tube 38, whereby the cutting edge 38*a* can progressively circumferentially or peripherally shear, cut, strip and peel any growth on the outer diameter of support tube 14 off. This can allow the support tube 14 to be raised vertically even when there is growth covering the outer surface of the support tube 14. If desired, the removable plate 28 can be unlocked and lifted upwardly from mounting bracket 12 for removal of the attached guide tube 38, support tube 14 and light assembly 16 for replacement, or storage.

Referring to FIGS. 6-10, typically, the light apparatus 10 can be mostly formed of stainless steel components for corrosion resistance, but can be alternatively formed of other suitable metals and materials, including other metals, and polymeric or composite materials. The following description describes details for one particular embodiment in the present invention, which correspond to FIGS. 6-10.

The mounting bracket 12 can be made of ⅜ inch stainless steel plate about 4.5"×7" with two holes 0.375 inches in diameter located 2½ inches from the top and 9/16 of an inch in from the sides to serve as mounting holes 12*a*. Two 1"×0.375"×4.5" with a 45° chamfer on one 4.5" side, can be used in two locations on the base plate of mounting bracket 12, located 1.125 inches and welded short side down top and bottom, to establish locking guide bars 26 and form track 27 therebetween. The removable plate 28 can be about ⅜"× 3.5"×4.5", and chamfered on two sides, down to about 2.5" of the face. Two 45° chamfers can be on each side and facilitate the removable plate 28 to slide into and out of the track 27 between the two 1 inch by 4.5" locking guide bars 26. Welded to the center of the removable plate 28 is a 1"×5"×0.12" wall thickness, round or circular guide tube 38 with a 45° chamfer on one end, the lower or bottom end, to create a weed cutter or cutting blade 38*a*. The 1 inch guide tube 38 can be welded on the 2½ inch face side and flush with the top of the plate with the 45° chamfer overhanging the bottom edge by a half-inch. Two ¼" mounting holes 28*a* can be located on either side of the 1 inch stainless steel guide tube 38 and threaded into plate 28. A stainless steel washer 2"×0.125" with ¾" center hole can be welded to the top of the 1 inch stainless steel guide tube 38 to create a bottom stop 34 and position locator, with a 0.375"×0.375" milled slot on center 90° from plate 28, 0.125 inches in from the front edge to create locking positions. A 0.25" hole 38*c* can be drilled in the 1 inch stainless steel guide tube 38 face, and into the 0.750 inch sliding support tube 14 in top position ½ the distance from the top to establish a removable service pin with removable pin 39.

The elongate support member or tube 14 can be a sliding 0.750 inch diameter round or circular stainless steel tube with a wall thickness of 0.12"×48" long and threaded ¾-10×1" long on the distal end 14*b* and a 45° face slice on the proximal end 14*a* to facilitate wiring with wires 22. A 2"×0.125"×0.75" stainless steel washer can be welded to the sliding tube 14, about 3¾ inches down from the top of the slice cut to create the upper shaft stop 36. A 0.312"×0.312" stainless steel pin 37 can be welded to a 2" washer 0.125" inch in from the front edge, to create a position lock. The sliding 0.75 inch diameter stainless steel support tube 14 can be installed into the 1" stainless steel guide tube 38, bringing the two 2" stainless steel washers together to lock and align with the service pin location.

The light assembly 16 can have a housing 32 formed from a round or circular CPVC mounting sleeve, having a 2"×4.125" OD with a ¾"-10 threaded hole 32*a* for fastening to the sliding 0.75 inch diameter stainless steel support tube 14, threaded and backed up with a 304 stainless steel ¾"-10 hex jam nut. LED fixture rings 40 can be mounted to CPVC sleeve 32 with fasteners 42 to facilitate the installation. Fixture wiring 22 can be snaked through the tube 14 interior 14*c* to top of tube and wired to underwater plug pigtails. A waterproof and heat shrunk connection can be enclosed within a BMX mushroom style black grip 24. The light assembly 16 can be installed with mounted fixtures 30 into preinstalled mounting brackets 44 for service. Shaft or tube 14 can rotate 360° for light beam focus, and can lock in 90° position. Although particular sizes, shapes and dimensions have been described above, it is understood that these can vary depending upon the situation at hand. Referring to FIG. 11, underwater light apparatus, assembly, unit or fixture 50 is another embodiment in the present invention which differs from light apparatus 10 in that the light assembly 16 has a single light fixture 30 secured to housing 32, and the opposite side of housing 32 can be closed or sealed with an end wall 52. A sacrificial metal ring or slug 54, for example zinc, can be positioned around support tube 14 on top of housing 32, to be electrochemically consumed instead of the stainless steel components such as the support tube 14. The guide tube 38 can be attached to a removable plate or member 58 which can be secured to a mounting plate or bracket 56 that can be secured to a surface 18*a*. Referring to FIG. 12, underwater light apparatus assembly, unit or fixture 60 is another embodiment in the present invention that differs from light apparatus 10 in that the light assembly 16 has four light fixtures 30 secured to opposite sides of housing 32 in upper and lower levels. The lower level light fixtures 30 can face in opposite directions, and the upper level light fixtures 30 can also face in opposite directions to each other, but can be at right angles to the lower level light fixtures 30, so that the light fixtures 30 can collectively illuminate in four directions outwardly. The light apparatus 60 can also have a mounting bracket 56 and removable plate 58, but alternatively, light apparatuses 50 and 60 can employ mounting bracket 12 and removable plate 28.

Figure 14:
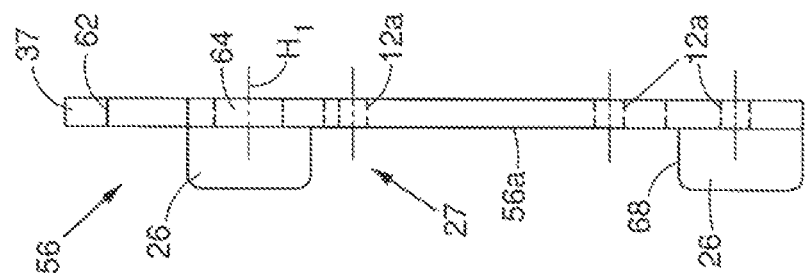
FIG. 14 is a side view of the mounting bracket of FIG. 13.
Figure 13:
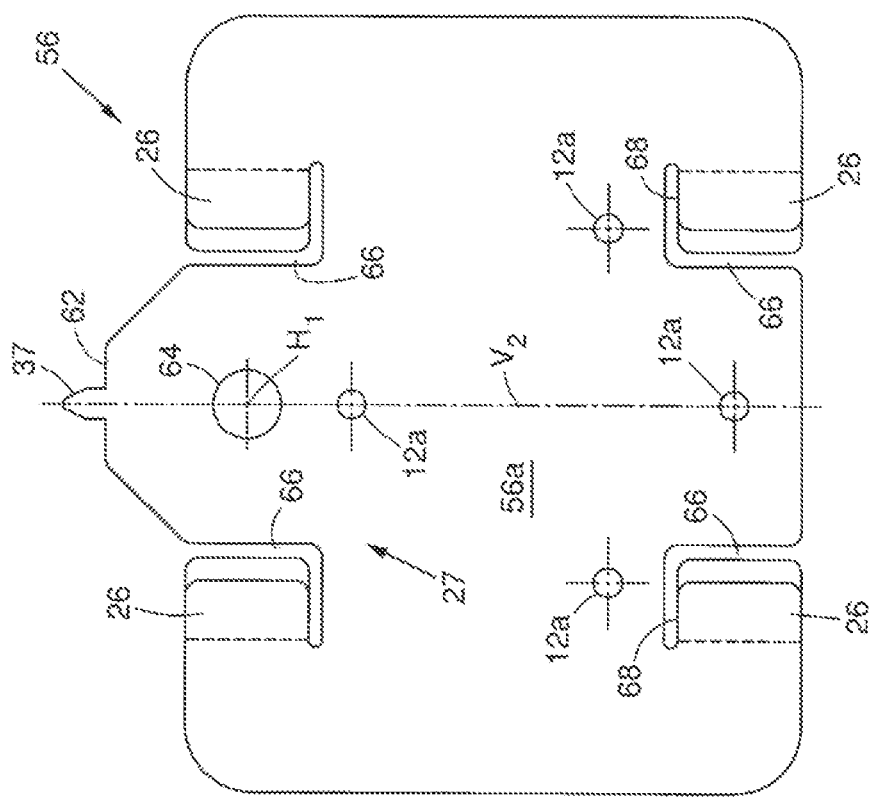
FIG. 13 is a front view of another embodiment of a mounting bracket in the present invention.
Figure 15:
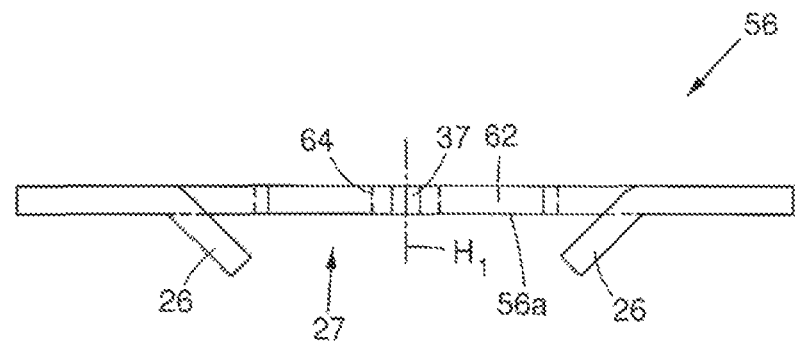
FIG. 15 is a top end view of the mounting bracket of FIG. 13.

Referring to FIGS. 13-15, mounting plate or bracket 56 can be generally flat or planar, and have two pairs (total of four) of guide or locking rails, tabs, protrusions, walls, sides, surfaces or bars 26 bent upwardly at an angle, for example, about 45°, at the top and bottom to form a vertical guide or retaining structure, pocket, slot, track or channel 27 therebetween. The tabs 26 can be formed by making right angled cuts 66 in the mounting plate 56 at the top and bottom, and the inwardly facing surfaces of tabs 26 can trap, contain or constrain a vertically inserted removable plate 58 (FIGS. 16-18) between the tabs 26 and against the flat front surface 56a of the mounting bracket 56. Mounting holes 12a, for example four, can be positioned within the region of the track 27 so that the removable plate 58 can cover the fasteners 13 when mounted to a surface 18a, thereby making it difficult for unauthorized persons from easily determining how to remove the mounting bracket 56 from surface 18a, to help prevent theft. Two mounting holes 12a can be positioned along the central vertical axis $V_2$, and two mounting holes 12a can be positioned on opposite sides of axis $V_2$. A locking recess, opening or hole 64 can be positioned on axis $V_2$ near the top, and also on a horizontal axis $H_1$ for locking the removable plate 58 to the mounting plate 56, which will be described later. The top of the mounting bracket 56 can have an upper mechanical stop surface 62 and a locking protrusion 37 extending upwardly from the stop 62 along axis $V_2$, for rotationally locking support tube 14, which will also be described in more detail later.

Figure 18:
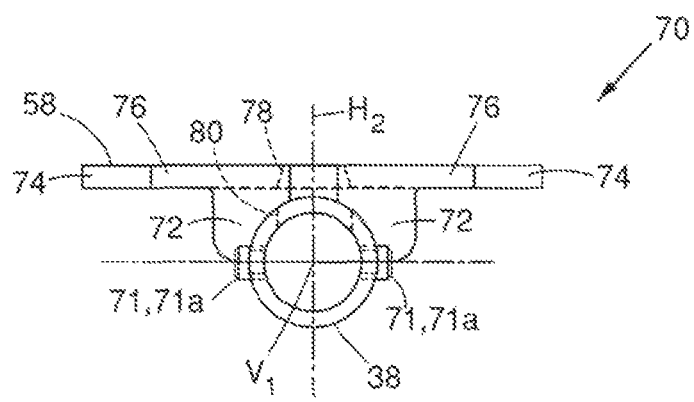
FIG. 18 is a top end view of the assembly of FIG. 16.
Figure 16:
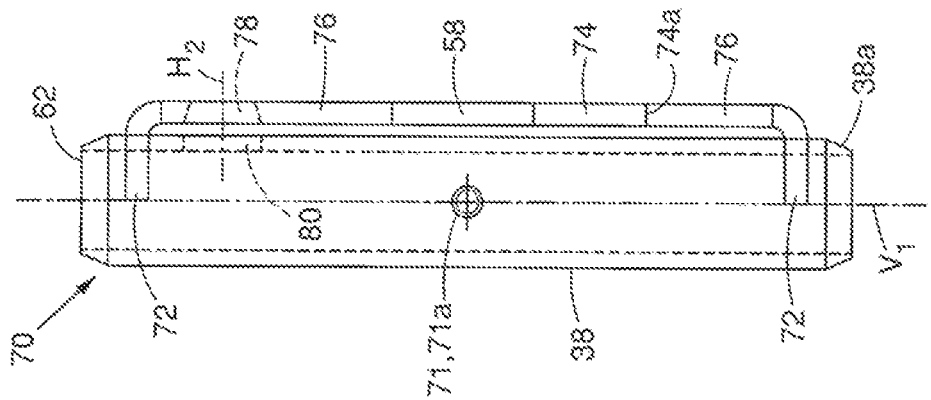
FIG. 16 is a front view of another embodiment of a removable plate and guide tube assembly in the present invention.
Figure 17:
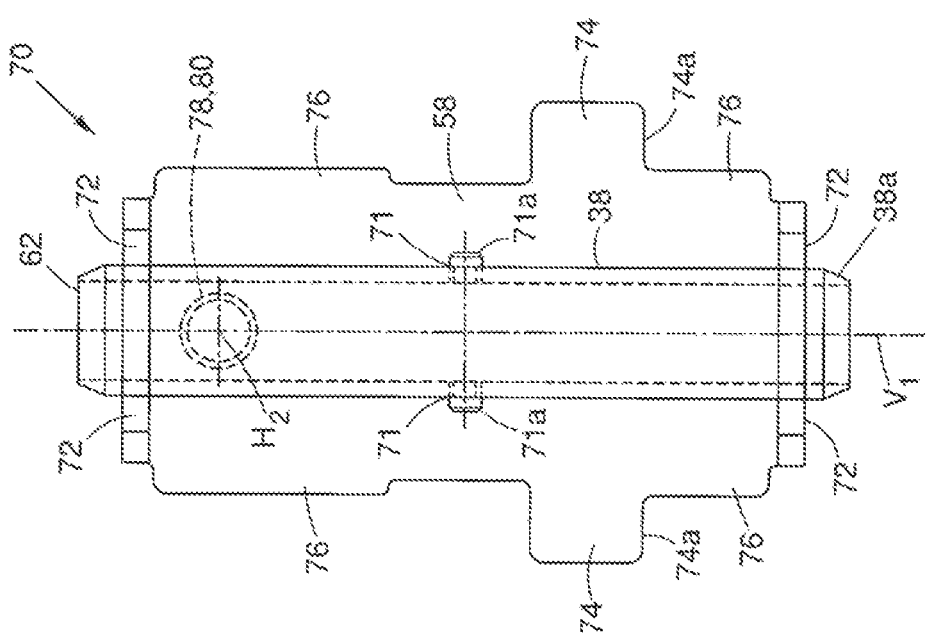
FIG. 17 is a side view of the assembly of FIG. 16.
Figure 21:
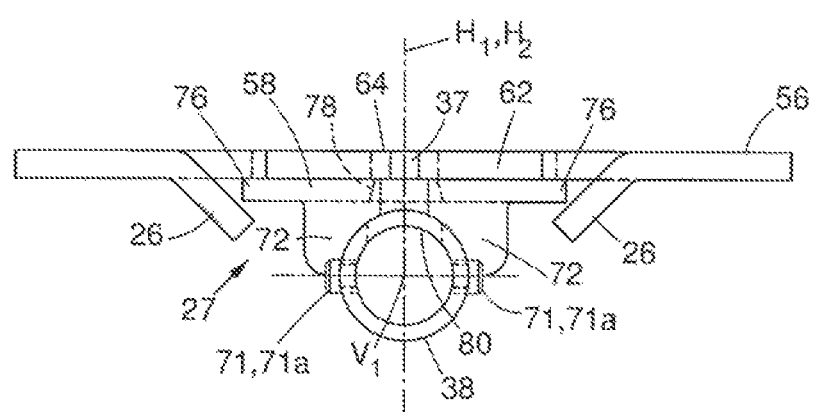
FIG. 21 is a top end view of the assembled components of FIG. 19.

Referring to FIGS. 16-18, guide tube 38 can be attached, secured or welded to removable plate 58, to ears 72 that are bent at right angles from the top and bottom ends or edges of removable plate 58, forming a removable plate and guide tube assembly or fabrication 70. The upper and lower ends of the removable plate 58 can have upper and lower pairs of lateral locking guides, protrusions, tabs or ears 76, extending from opposite sides, which are sized with a lateral width between the side edges, to slidably fit within the track 27 of mounting bracket 56 by slidable insertion downwardly into track 27. This allows the upper and lower ears 76 to be trapped and constrained or contained between the upper and lower pairs of tabs 26, and surface 56a of mounting bracket 56, as seen in FIGS. 19-21, which shows removable plate 58 assembled with mounting bracket 56. A pair of vertical position stop tabs, protrusions or ears 74, can extend laterally from opposite sides of the removable plate 58 above and laterally beyond the lower pair of ears 76, and have lower stop surfaces 74a on the bottom edges, for engaging upper stop surfaces 68 on the top or upper edge of the lower pair of tabs 26, thereby constraining or trapping the removable plate 58 within the track 27, and preventing further downward movement relative to mounting bracket 56. The removable plate 58 and the ears 74 can cover the mounting holes 12a and fasteners 13, as shown in FIGS. 19 and 22 to help prevent theft. The cutting edge or blade 38a at the bottom of guide tube 38 can be positioned or extended below the bottom of mounting bracket 56, and removable plate 58 or ears 72. The top or upper end of the guide tube 38 can have a mechanical stop 62 which can extend above the top of removable plate 58 and ears 72, and can be positionable at the same level as the mechanical stop 62 of the mounting bracket 56. The guide tube 38 can have a hole 80 extending through the rear along the horizontal axis $H_2$ that is aligned with an adjacent hole 78 extending through the removable plate 58, which is also along horizontal axis $H_2$. Horizontal axis $H_2$ can be aligned with and intersect axis $V_1$. When removable plate 58 is inserted and fitted into track 27, holes 80, hole 78 and axis $H_2$ can be aligned with hole 64 and axis $H_1$ of mounting bracket 56. If vertical locking of the support tube 14 within guide tube 38 is desired, at least one set screw 71a can be tightened within a threaded hole 71 through the side of the guide tube 38 against support tube 14, and two can be on opposite sides of guide tube 38, as shown in FIGS. 19 and 22.

Figure 7:
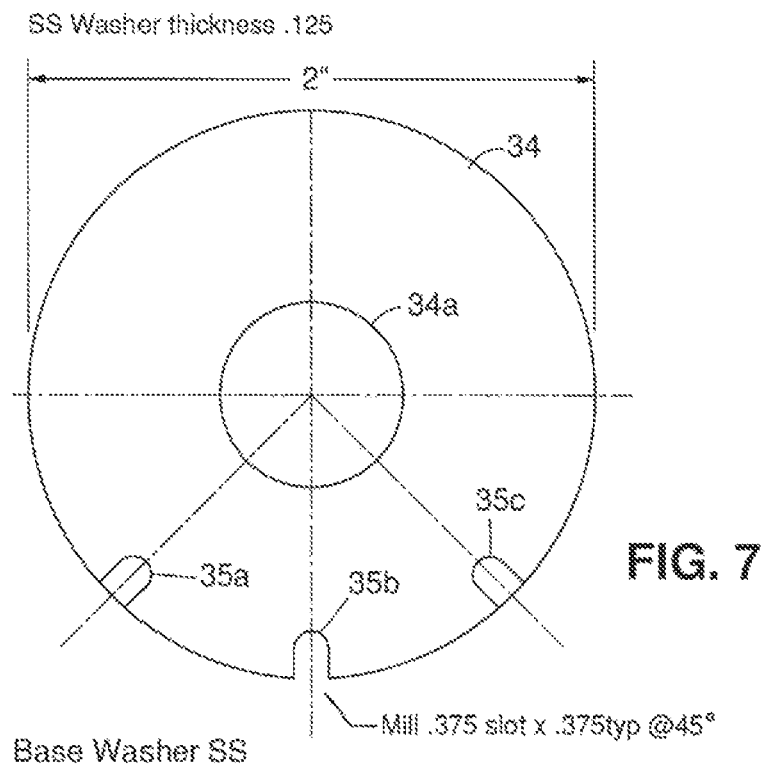
FIG. 7 is a plan view of an embodiment of a lower washer stop.
Figure 8:
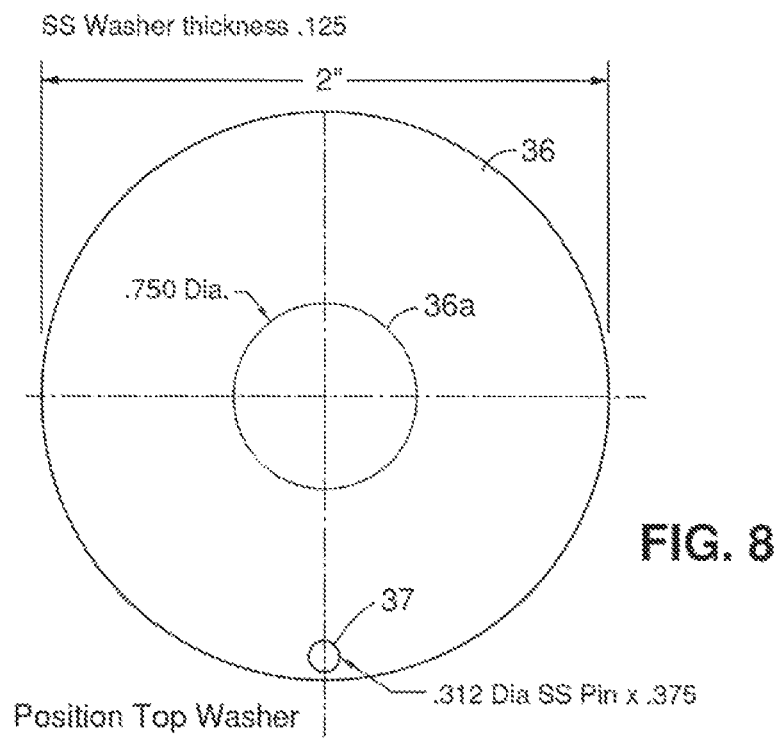
FIG. 8 is a plan view of an embodiment of an upper washer stop.
Figure 24:
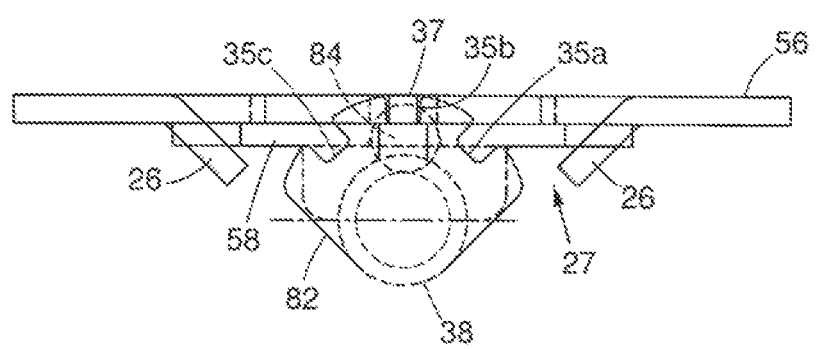
FIG. 24 is a schematic top view of selected assembled components of FIG. 22, showing the upper stop and rotational locking arrangement.

Referring to FIGS. 22-24, in use, once mounting plate 56 is secured to a surface 18a, the removable plate 58 of assembly 70 that is slidably supporting the support tube 14 and the light assembly 16, is attached to the mounting plate 56 within track 27, covering the fasteners 13. The support tube 14 in FIGS. 22 and 23 can differ from that in FIGS. 3-6 and 9, in that the proximal end 14a can have a lateral slot milled through the sidewall instead of an angled end cut or slice, an upper stop 82 having slots or notches 35a, 35b and 35c such as seen in FIG. 7 is attached or welded to support tube 14 for selectively engaging protrusion 37 of mounting bracket 56 instead of using the upper stop 36, where the upper stop 82 can be a semicircle instead of a round washer, if desired (FIG. 24), and an indentation, indent or recess 86 can be formed in the outer surface of the support tube 14. The indentation 86 can be generally round and can be located below the upper stop 82 on the side opposite to notches 35a-35c, and when the upper stop 82 is positioned against stop 62, can be below axes $H_1$ and $H_2$ by a short distance, for example, about ¼-1 inches. During insertion of the removable plate 58 into track 27, a movable locking member or ball 84 can be positioned within holes 80 and 78, and the support tube 14 can be translated and rotated relative to guide tube 38 to position indentation 86 in line with axis $H_2$ and holes 80 and 78, so that the locking ball 84 can be pushed into the indentation 86 as the removable plate 58 travels in track 27, thereby allowing the locking ball 84 to depress or become recessed within hole 78 and plate 58, so that the removable plate 58 can slide all the way down into track 27. The hole 78 can be slightly tapered, narrowing to the rear of plate 58, to retain the locking ball 84 and prevent it from falling out. Once the locking ball 84, hole 80, hole 78, and axis $H_2$ are aligned with axis $H_1$ and locking hole 64, the support tube 14 can be rotated and/or slid downwardly to move indentation 86 away from the locking ball 84, thereby moving the outer circumferential or diameter surfaces of the support tube 14 against the locking ball 84, thereby pushing the locking ball 84 laterally outwardly through hole 78 of removable plate 58 along axes $H_1$ and $H_2$, until a portion of locking ball 84 extends into and lockably engages the locking hole 64 of mounting bracket 56 while a portion still remains within hole 78. This can vertically lock the removable plate 58 in place to the mounting bracket 56. The support tube 14 is slid downwardly until upper stop 82 engages lower stops 62, and rotated so that the desired notch 35a-35c, is engaged with locking protrusion 37, to rotatably lock the support tube 14 and light assembly 16 in the desired rotational orientation. If desired, the set screws 71a can be tightened to vertically lock the support tube 14 relative to guide tube 38. In some situations, it can be desirable not to vertically lock support tube 14. When the support tube 14 is slid or translated upwardly within and relative to guide tube 38, any growth 88 such as seaweed, vegetation, sea creatures or barnacles on the support tube 14, can be sheared or cut off the support tube 14 (FIG. 23) in a continuous, progressive and peripheral, circumferential or annular manner by the peripheral, annular, circumferential or circular cutting blade 38a which has the close peripheral, annular, circumferential or circular sliding fit with the outer diameter of the support tube 14. This can form a wiping cutting action, and the angled angular chamfer of blade 38a can direct the sheared growth 88 annularly or radially outwardly away from the guide tube 38. The mounting bracket 56 and fabrication 70 can be about the same general size as the mounting bracket 12 and fabrication 45, and can be formed of similar materials as described.

While this invention has been particularly shown and described with references to example embodiments thereof, it will be understood by those skilled in the art that various changes in form and details may be made therein without departing from the scope of the invention encompassed by the appended claims. For example, it is understood that dimensions and shapes of components in the present invention, can vary, as desired. In addition, some components of particular embodiments can be omitted or combined. The support tube 14 and guide tube 38 in some embodiments can have a non-circular cross section, whereby rotation or pivoting of the light assembly 16 can be provided with other suitable mechanisms or arrangements, if desired. Rotation is not needed if the light assembly 16 has a circular shaped light fixture 30.

What is claimed is:

1. An underwater light apparatus comprising
a light assembly for providing light:
an elongate support member having proximal and distal ends, the distal end of the elongate support member being secured to the light assembly, the elongate support member comprising a hollow tube containing electrical wires extending therethrough for electrical connection to the light assembly; and
a mounting bracket for mounting to a surface, the elongate support member being vertically slidably mounted to the mounting bracket for vertically lowering and raising the elongate support member and the light assembly into water for providing underwater illumination, and out of water for maintenance, the elongate support member being vertically slidable within a vertically oriented guide tube, the guide tube having a lower end with an angled cutting surface for cutting at least one of weeds, vegetation or barnacles from the elongate support member when the elongate member is slid upwardly within the guide tube.

2. The light apparatus of claim 1 in which the guide tube is removably secured to the mounting bracket within a retaining structure.

3. The light apparatus of claim 2 in which the retaining structure comprises a vertically extending retaining track from which the guide tube can be vertically lifted for removal.

4. The light apparatus of claim 1 further comprising a vertical stop and a rotational position locking mechanism for controlling vertical position and rotational orientation of the elongate support member and light assembly, when in a lowered position.

5. The light apparatus of claim 1 in which the light assembly comprises a housing secured to the distal end of the elongate support member and at least one LED light unit secured to the housing.

6. The light apparatus of claim 3 in which the guide tube is secured to a removable plate, the removable plate being removably insertable into the retaining track.

7. The light apparatus of claim 6 in which the mounting bracket includes mounting holes for securement to a surface with fasteners, the mounting holes being located within the retaining track to allow the removable plate to cover the mounting holes when inserted into the retaining track to hide the mounting holes.

8. The light apparatus of claim 7 further comprising a movable locking ball movably positioned within an aperture extending through adjacent walls of the guide tube and removable plate, and capable of being forced by the elongate support member within the guide tube to extend a portion of the locking ball into a locking recess within the mounting bracket, thereby locking the removable plate and guide tube to the mounting bracket.

9. The light apparatus of claim 8 in which the elongate support member includes a recess on a lateral surface for aligning with the locking ball, for allowing part of the locking ball to move therein to recess the locking ball within said aperture through the guide tube and removable plate, thereby allowing insertion and removal of the removable plate in and out of the retaining track.

10. A method of operating an underwater light apparatus comprising
providing a light assembly for providing light within water;
supporting the light assembly with an elongate support member having proximal and distal ends, the distal end of the elongate support member being secured to the light assembly;
mounting a mounting bracket to a surface and vertically slidably mounting the elongate support member to the mounting bracket;
vertically lowering the elongate support member and the light assembly into the water for providing underwater illumination, and vertically raising the elongate support member and the light assembly out of the water for maintenance; and
vertically sliding the elongate support member within a vertically oriented guide tube, the guide tube having a lower end with an angled cutting surface for cutting at least one of weeds, vegetation and barnacles from the elongate support member when the elongate support member is slid upwardly within the guide tube.

11. The method of claim 10 further comprising removably securing the guide tube to the mounting bracket within a retaining structure.

12. The method of claim 11 further comprising providing the retaining structure with a vertically extending retaining track from which the guide tube can be vertically lifted for removal.

13. The method of claim 10 further comprising controlling vertical position and rotational orientation of the elongate support member and light assembly when in a lowered position, with a vertical stop and a rotational position locking mechanism.

14. The method of claim 12 in which the guide tube is secured to a removable plate, the method further comprising removably inserting the removable plate into the retaining track.

15. The method of claim 14 in which the mounting bracket includes mounting holes for securement to a surface with fasteners, the mounting holes being located within the retaining track, the method further comprising covering the mounting holes with the removable plate when the removable plate is inserted into the retaining track to hide the mounting holes.

16. The method of claim 15 further comprising movably positioning a movable locking ball within an aperture extending through adjacent walls of the guide tube and removable plate, and capable of being forced by the elongate support member within the guide tube to extend a portion of the locking ball into a locking recess within the mounting bracket, thereby locking the removable plate and guide tube to the mounting bracket.

17. The method of claim 16 further comprising providing the elongate support member with a recess on a lateral surface for aligning with the locking ball, for allowing part of the locking ball to move therein to recess the locking ball within said aperture through the guide tube and removable plate, thereby allowing insertion and removal of the removable plate in and out of the retaining track.

* * * * *